Jan. 3, 1928.  
G. BANTA  
1,655,215  
DEVICE FOR APPLYING MATERIAL TO THE SKIN  
Filed Jan. 14, 1926
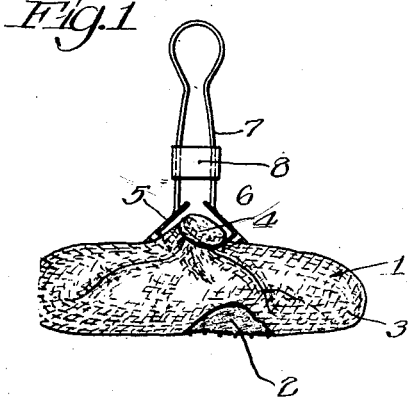
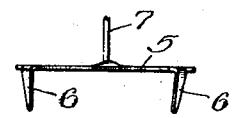
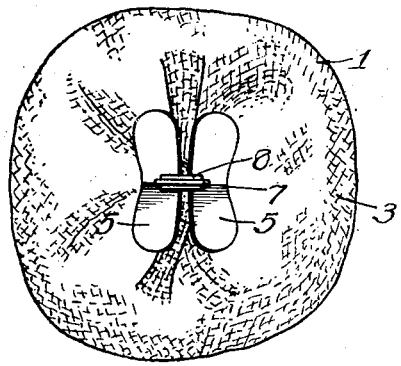
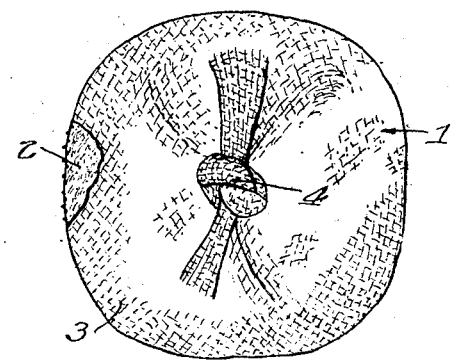
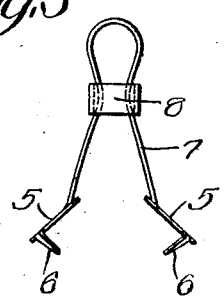
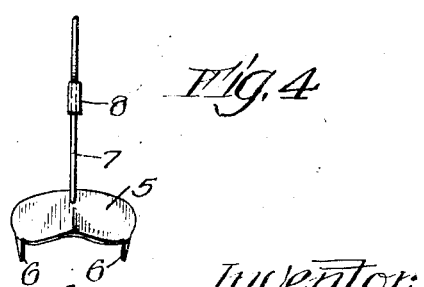

Patented Jan. 3, 1928.

1,655,215

UNITED STATES PATENT OFFICE.

GEORGETTE BANTA, OF CHICAGO, ILLINOIS.

DEVICE FOR APPLYING MATERIAL TO THE SKIN.

Application filed January 14, 1926. Serial No. 81,167.

This invention relates to a device for applying material to the skin and has for its object to provide a new and improved device of this description.

The invention has as a further object to provide a sanitary device for applying material to the skin such as powder, ointment and the like, and which is provided with a removable holder by means of which the application can be made without the fingers or hands touching the part containing the material.

The invention has other objects which are more particularly pointed out in the accompanying description.

Referring now to the drawings:

Fig. 1 is a side elevation of one form of device embodying the invention.

Fig. 2 is a plan view of the device shown in Fig. 1.

Fig. 3 is a side elevation of one form of holder.

Fig. 4 is a view of the holder shown in Fig. 3 as seen at right angles to Fig. 3.

Fig. 5 is a view of one of the engaging devices of the holder as seen from the edge.

Fig. 6 is a view similar to Fig. 2, but with the holder omitted and a part broken away.

Like numerals refer to like parts throughout the several figures.

Referring now to the accompanying drawings, I have shown a skin engaging part 1 which may be of any suitable form such as the ordinary powder puff. This skin engaging part may be simply a piece of cotton or the like or a piece of cloth. I have shown a simple inexpensive form of the device which consists of a piece of cotton 2 enclosed in an enclosing piece 3 of flexible material such as cloth. This cloth may be held in position in any desired manner as by simply tying the knot 4. The material to be applied, whether powder, ointment or the like, is applied to the bottom of the skin engaging device in whatever form it is made.

Connected with the skin engaging device is a removable holder arranged so that it can be easily and quickly attached to and removed from the skin engaging device. I have shown in the accompanying drawing one form of this holder. This form of holder consists of two engaging devices which consist of the body portions 5 and the fastening pieces 6. A handle part 7 is connected with the body portions 5. The fastening devices 6 are arranged so that they can be separated and are then brought toward each other to engage the skin engaging device so as to be attached thereto. Some means is provided for holding them in such engagement. This is accomplished in the structure shown by the holding device 8. This holding device is shown in the form of a loop which surrounds the member of the handle 7. When moved toward the top of the handle the engaging parts 6 may be separated, and when moved down toward the engaging parts this holder causes them to move toward each other and they are held in this position. The handle 7 may be made of spring material if desired so that when the holding device is moved upwardly to the position shown in Fig. 3 the engaging devices will spring out in their separated position.

When it is desired to attach the handle to the skin engaging device these engaging parts 6 are separated and the device then placed down upon the skin engaging device and the holding device 8 moved downwardly to bring the engaging devices toward each other and to cause them to project into the skin engaging device or some part connected therewith. It will be seen that I have provided here a simple construction which may be manufactured at a low cost and which is sanitary, making it unnecessary for the user to touch the skin engaging device in manipulating it. In the particular construction shown the handle may also be removed without the fingers engaging the skin engaging device.

By making the skin engaging device consisting of an outer covering with a filling of soft material like cotton, the edges of the covering being fastened together by knots or by other means near the center of one face of the device, there is produced a skin engaging part which can be made at a low cost and can therefore be discarded when desired and a new skin engaging device used, it simply being necessary to remove the handle from the holding device and attach it to the new device.

I have shown and described a particular construction but it is of course evident that the device may be changed in form, construction and arrangement without departing from the spirit of the invention as embodied in the claims hereto appended, and I therefore do not limit myself to the particular construction shown.

It will be noted that the outer covering has its edges interlocked, that is tied in a knot so that the outer covering is held in its enclosing position without the necessity of any additional fastening devices, the cover itself acting by means of the knot to fasten itself in its enclosing position.

I claim:—

1. A device for applying material to the skin comprising a skin engaging device of soft material, a handle having two opposed engaging parts connected therewith and adapted to be separated and then moved toward each other to connect the handle with the skin engaging part, and a holding device movably connected with said handle for holding said engaging devices in their attached position.

2. A device for applying material to the skin comprising a skin engaging device, a handle having two engaging parts which engage the skin engaging device, and a looped handle member having its ends connected therewith, and a holding device surrounding the movable handle member and movably connected therewith.

3. A device for applying material to the skin comprising a skin engaging device consisting of a flexible outer covering, a filling of soft material enclosed in said outer covering, the edges of the covering being interlocked near the center of one face of the device, so as to hold the outer covering in its enclosing position and a stiff handle removably connected with the interlocked portion of the edges of said covering.

4. A device for applying material to the skin comprising a skin engaging device consisting of a flexible outer covering, a filling of soft material therein, the edges of the covering being fastened together near the center of one face of the device, and a removable handle fastened to the skin engaging device at the point where the edges of the covering are fastened together.

Signed at Chicago county of Cook and State of Illinois, this 7th day of January, 1926.

GEORGETTE BANTA.